United States Patent [19]

Ozawa et al.

[11] Patent Number: 5,727,925

[45] Date of Patent: Mar. 17, 1998

[54] APPARATUS FOR STACKING A PLURALITY OF CASES

[75] Inventors: Yuji Ozawa; Sadami Tabata, both of Sakado; Masaru Chiwaki, Kawagoe, all of Japan

[73] Assignee: Toyo Suisan Kaisha, Ltd., Tokyo, Japan

[21] Appl. No.: 558,902

[22] Filed: Nov. 16, 1995

[30] Foreign Application Priority Data

Apr. 21, 1995 [JP] Japan ................................ 7-096834
Apr. 21, 1995 [JP] Japan ................................ 7-096835

[51] Int. Cl.$^6$ ............................................... B65G 57/30
[52] U.S. Cl. ......................... 414/795.3; 414/795.2; 414/789.9; 414/790.3
[58] Field of Search ...................... 414/794.9, 795.2, 414/795.3, 789.7, 789.9, 790.3

[56] References Cited

U.S. PATENT DOCUMENTS

| | | | |
|---|---|---|---|
| 3,570,209 | 3/1971 | Salwasser | 414/795.2 |
| 4,778,323 | 10/1988 | Salts | 414/795.3 |
| 4,971,514 | 11/1990 | Hunter | 414/795.3 |
| 5,518,361 | 5/1996 | Smith | 414/795.3 |

FOREIGN PATENT DOCUMENTS

| | | | |
|---|---|---|---|
| 32367 | 7/1981 | European Pat. Off. | 414/795.2 |
| 213900 | 9/1984 | Germany | 414/795.3 |
| 126035 | 6/1987 | Japan | 414/795.3 |
| 148730 | 5/1992 | Japan | 414/795.3 |
| 406021 | 7/1966 | Switzerland | 414/795.2 |

*Primary Examiner*—Karen B. Merritt
*Assistant Examiner*—Douglas Hess
*Attorney, Agent, or Firm*—John P. White

[57] ABSTRACT

An apparatus according to the present invention comprises a lift mechanism provided at the end of an introducing-aligning conveyor mechanism and a shutter mechanism overlying the lift mechanism. A plurality of cases are arranged in alignment on the conveyor mechanism. The cases are pushed up by the lift mechanism and supported by the shutter mechanism. When cases of another set are then aligned on the introducing-aligning conveyor mechanism, the shutter mechanism opens, so that the cases supported thereon fall to be stacked on the second set. The stacked cases are pushed up by the lift mechanism and supported by the shutter mechanism. These processes of operation are repeated so that the cases are stacked in layers.

7 Claims, 12 Drawing Sheets

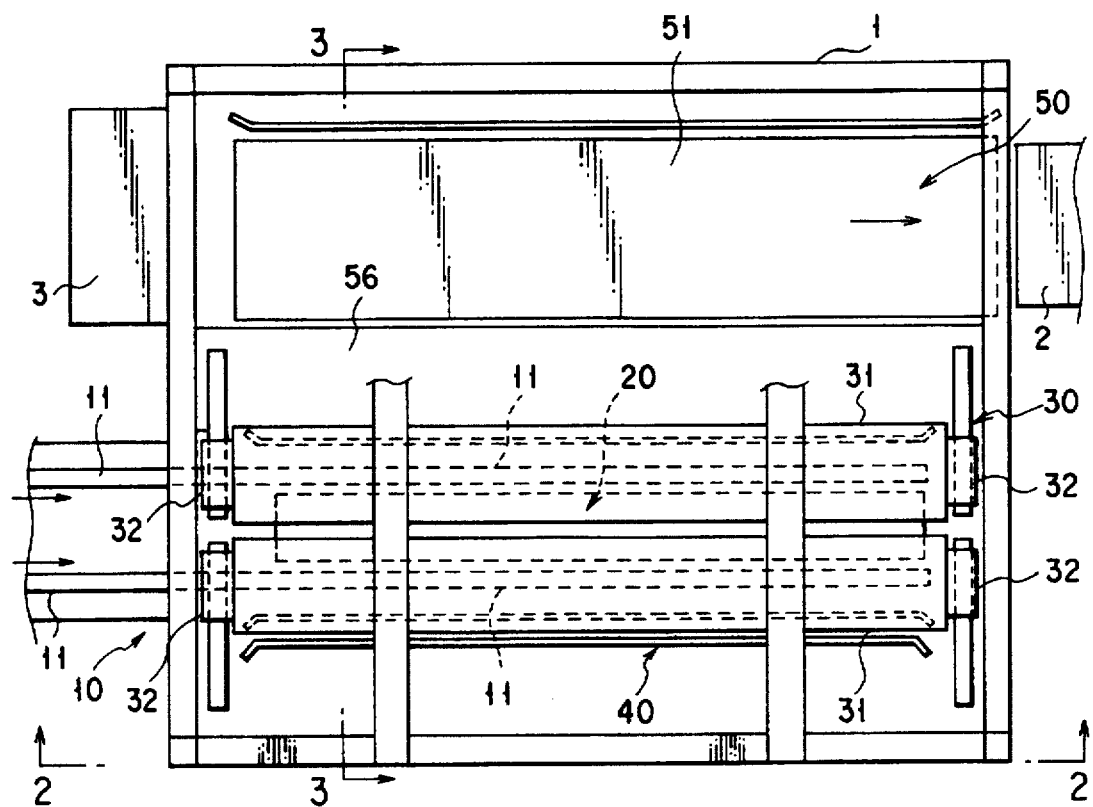
F I G. 1
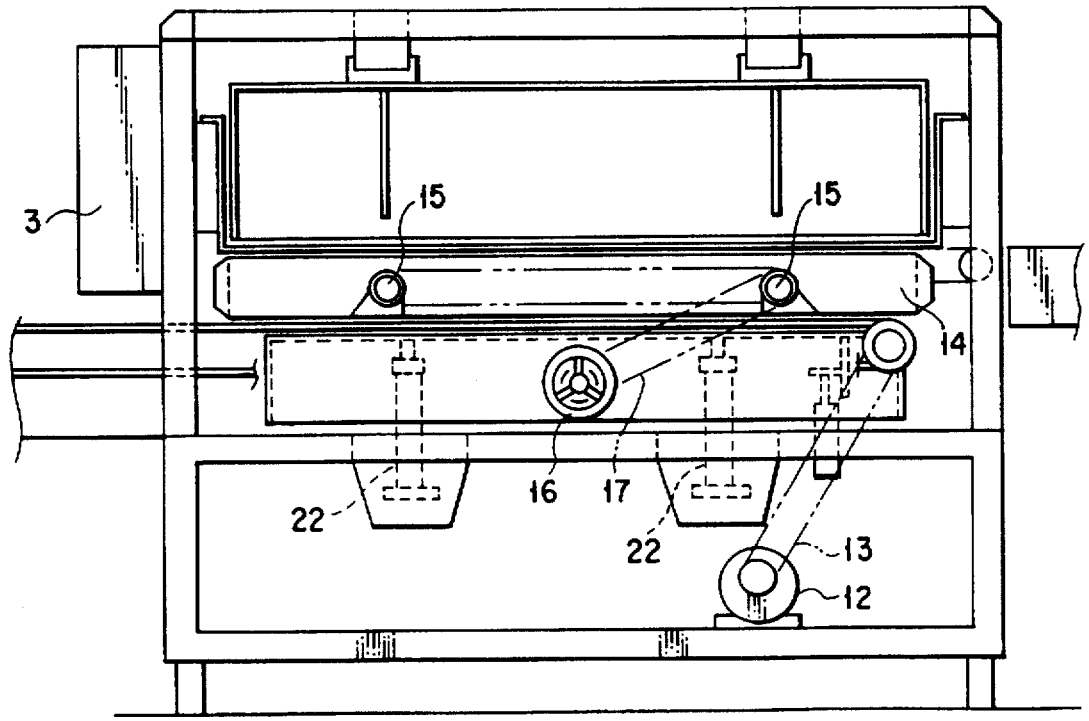
F I G. 2

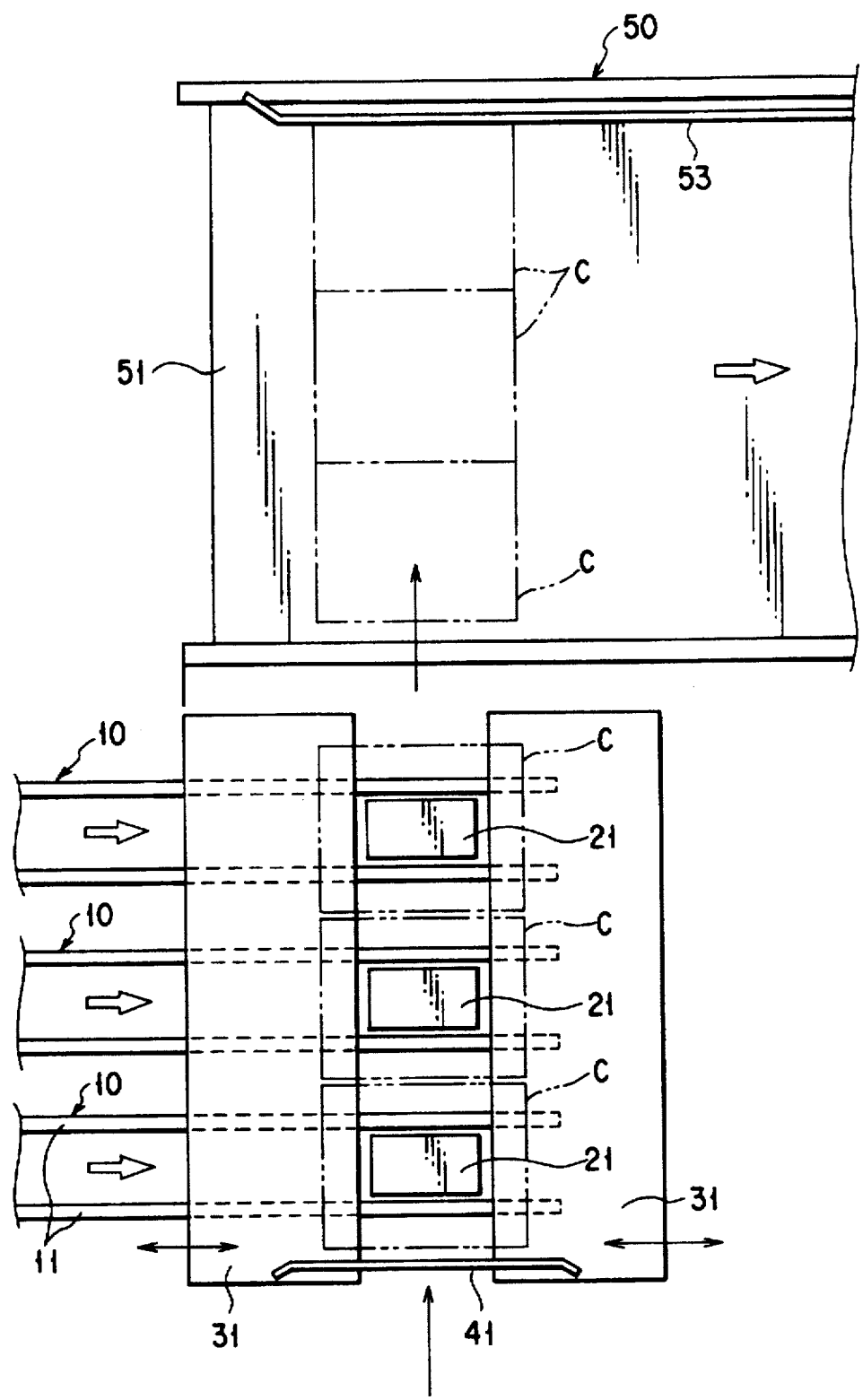
F I G. 19

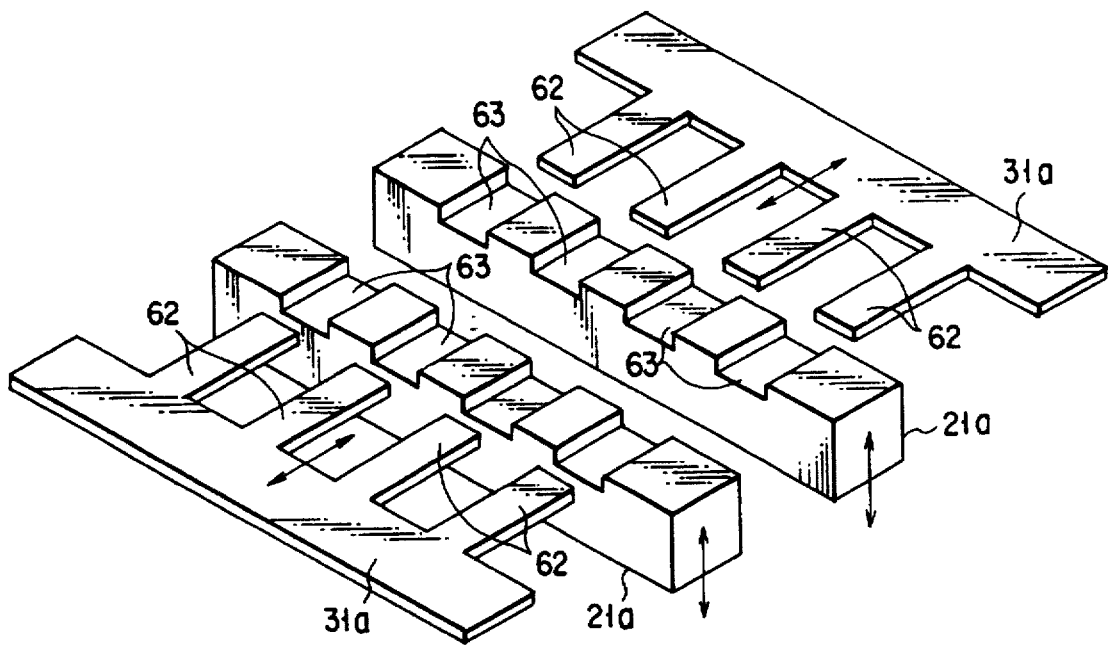
F I G. 21
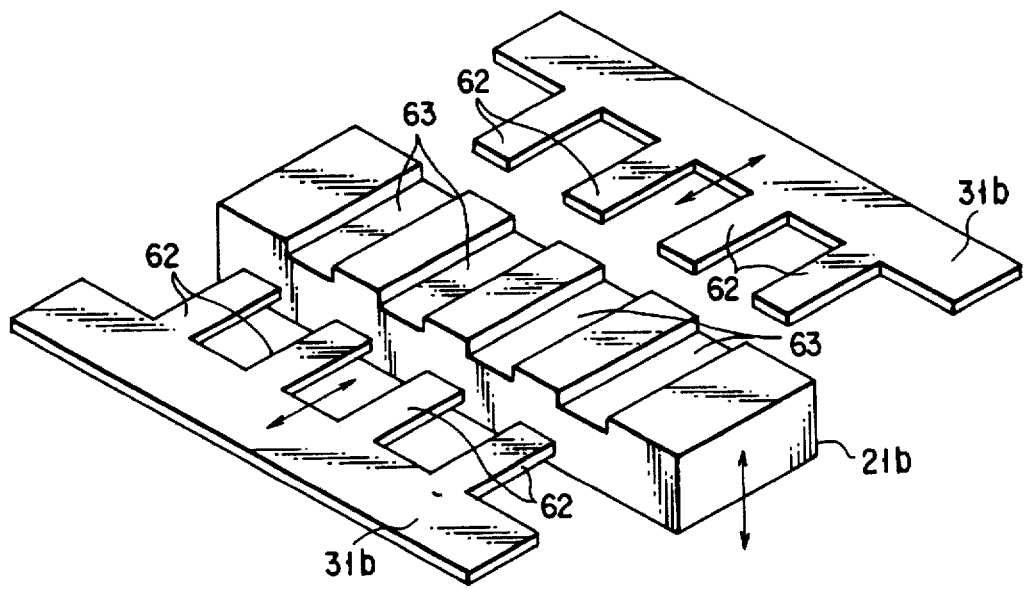
F I G. 22

APPARATUS FOR STACKING A PLURALITY OF CASES

BACKGROUND OF THE INVENTION

1. Field of the Invention

The present invention relates to an apparatus for stacking cases, such as corrugated cardboard boxes which contain foodstuffs or other products, in a plurality of layers, and more specifically, to a stacking apparatus capable of quickly stacking a large number of cases by aligning them without regard to the shape or size of each case and of securely preventing the cases from being damaged during stacking operation.

2. Description of the Related Art

Conventionally, foodstuffs, such as precooked noodles, and other products are packed in cases, such as corrugated cardboard boxes, in a final stage before they are shipped from the factory. In the factory's production line, each of the cases is sealed by taping or pasting. To facilitate transportation from the factory to stores, the cases are often stacked in layers and banded before shipping. The stacking operation is operators' manual operation, which is not very efficient and entails high cost.

To solve this problem, novel apparatuses have been developed for automatically stacking cases. One such automatic stacking apparatus comprises, for example, a lift mechanism at the terminal portion of a belt conveyor and a retaining mechanism located over the lift mechanism. In this apparatus, corrugated cardboard boxes or other cases delivered from the factory's production line are transported one after another on the belt conveyor, and are pushed up by means of the lift mechanism. The retaining mechanism is provided with a ratchet member. The ratchet member is rotated to push up each lifted case further, whereupon it engages the lower edge portion of the case so that the case is held in the raised position. When another case is delivered, it is also pushed up by the lift mechanism, and is further raised with the ratchet member in rotation and held in position. In this manner, the cases are piled up or stacked successively on the ratchet member.

However, this stacking apparatus can stack only one case at a time, so that its operating efficiency is not very high. Moreover, the position of the ratchet member and the like must be accurately adjusted depending on the size of the cases and other factors, and change of the type of cases to be handled requires troublesome adjustment. All of the cases to be stacked are not always entire rectangular boxes, and some may be tray-shaped corrugated cardboard boxes which contain precooked noodles or other products and are packaged in heat-shrinkable plastic film such that the products can be protected against moisture and dust and seen from the outside. The cases of this type, which are not in the form of a perfect rectangular prism each, cannot securely engage the ratchet member, and there is a possibility of the plastic film being torn by the ratchet member.

SUMMARY OF THE INVENTION

The present invention has been contrived in consideration of these circumstances, and its first object is to provide a stacking apparatus capable of stacking a large number of cases at a time and also of accurately stacking the cases without regard to the shape or size of each case.

A second object of the invention is to provide a stacking apparatus capable of stacking cases without damaging them or without the possibility of tearing plastic film or the like as a packaging material for those products which are contained in tray-shaped boxes packaged in the plastic film.

In order to achieve the above objects, an apparatus according to the invention comprises an introducing-aligning conveyor mechanism for introducing and aligning cases transported one after another and a lift mechanism for pushing up the cases aligned on the introducing-aligning conveyor mechanism.

A shutter mechanism is provided over the introducing-aligning conveyor mechanism. The shutter mechanism includes a pair of shutter plates, right and left, which horizontally move away from and toward each other for open-close operation, thereby supporting the lifted cases.

The cases, transported one after another, are introduced and aligned longitudinally or transversely by the introducing-aligning conveyor mechanism. Then, the aligned cases are pushed up above the shutter plates of the shutter mechanism by the lift mechanism, with the shutter plates open. Then, the shutter plates close and support the lifted cases. When cases of another set are aligned on the introducing-aligning conveyor mechanism, thereafter, the shutter mechanism opens. Thereupon, the cases of the first set having so far been supported on the shutter plates fall onto the cases of the second set aligned on the introducing-aligning conveyor mechanism, to be stacked thereon. Then, the stacked cases are pushed up by the lift mechanism, whereupon the shutter plates close and support the stacked cases thereon. These processes of operation are repeated so that the cases are stacked in a plurality of layers on the shutter plates.

According to the case stacking apparatus of the present invention, a plurality of aligned cases are supported by the pair of shutter plates which open and close after the cases are pushed up by the lift mechanism, so that the respective positions of the shutter plates need not be accurately adjusted corresponding to the size of the cases or the like. The apparatus of the invention can securely stack the cases even if each case is not accurately in the form of a rectangular prism, thus ensuring high reliability. Since the shutter plates never engage or interfere with the cases, there is no possibility of their damaging packaging film on the cases.

Since the cases aligned on the introducing-aligning conveyor mechanism are stacked after being pushed up, moreover, a plurality of cases can be stacked simultaneously, that is, with high efficiency.

Preferably, according to the present invention, a delivery conveyor mechanism is provided beside the shutter mechanism. This conveyor mechanism is situated substantially flush with the shutter plates of the shutter mechanism. Also provided is a transfer mechanism for moving the stacked cases on the shutter plates sideways along the shutter plates, thereby transferring the cases onto the delivery conveyor mechanism. In this arrangement, the cases stacked on the shutter plates are transferred onto the delivery conveyor mechanism, and are delivered in the stacked state to the next process, such as a packing process, by the delivery conveyor mechanism. Thus, continuous operation can be effected.

In this case, the transfer mechanism includes a transfer plate which abuts against one side face of each of the cases stacked on the shutter plates, thereby causing the cases to move sideways. Also, the apparatus is provided with a guide plate which is located beside the delivery conveyor mechanism, and abuts against the other side face of each of the transferred cases. Thus, the cases can be transferred onto the delivery conveyor mechanism in a manner such that they are held between the guide plate and the transfer plate and are stacked accurately in alignment with one another.

Preferably, moreover, the lift mechanism includes a lift block which pushes up the cases aligned on the introducing-aligning conveyor mechanism to a position above the shutter plates. The width of the lift block is shorter than that of each case. The shutter plates of the shutter mechanism are switched between an open state in which the distance between them is longer than the width of each of the stacked cases and a closed state in which the distance between the shutter plates is shorter than the width of each case and longer than the width of the lift block. Thus, the shutter plates and the lift block never interfere with one another, and can enjoy simpler constructions.

Preferably, furthermore, the shutter plates can be closed alternatively in a first closed state such that the distance between them is shorter than the width of each case and longer than the width of the lift block or a second closed state such that the distance between the shutter plates is shorter than the width of the lift block. Thus, in transferring the cases stacked on the shutter plates to the delivery conveyor mechanism or other position, the bottom or other portion of each case sliding on the shutter plates can be securely prevented from being caught by the gap between the plates, by bringing the plates to the second closed state, that is, by narrowing the gap.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a plan view of an apparatus according to a first embodiment of the present invention;

FIG. 2 is a side view in the direction of arrow 2—2 of FIG. 1;

FIG. 19 is a schematic plan view showing a second embodiment;

FIG. 21 is a perspective view showing the principal part of the third embodiment; and FIG. 22 is a perspective view showing the principal part of a fourth embodiment.

DETAILED DESCRIPTION OF THE PREFERRED EMBODIMENTS

Referring now to FIGS. 1 to 18, a first embodiment of the present invention will be described. An apparatus according to the present embodiment is an apparatus for arranging a plurality of cases in a row in the transportation direction and stacking these cases in a plurality of layers, e.g., two layers. This apparatus, which can naturally stack entire rectangular boxes, such as corrugated cardboard boxes, can securely stack even those tray-shaped corrugated cardboard boxes (open-topped cases formed of a base and side faces each) which contain commercial products, such as precooked noodles, and are packaged entire in heat-shrinkable plastic film, that is, those containers which are not in the form of an entire rectangular prism each and whose plastic packaging film should never be damaged.

Figure 3:
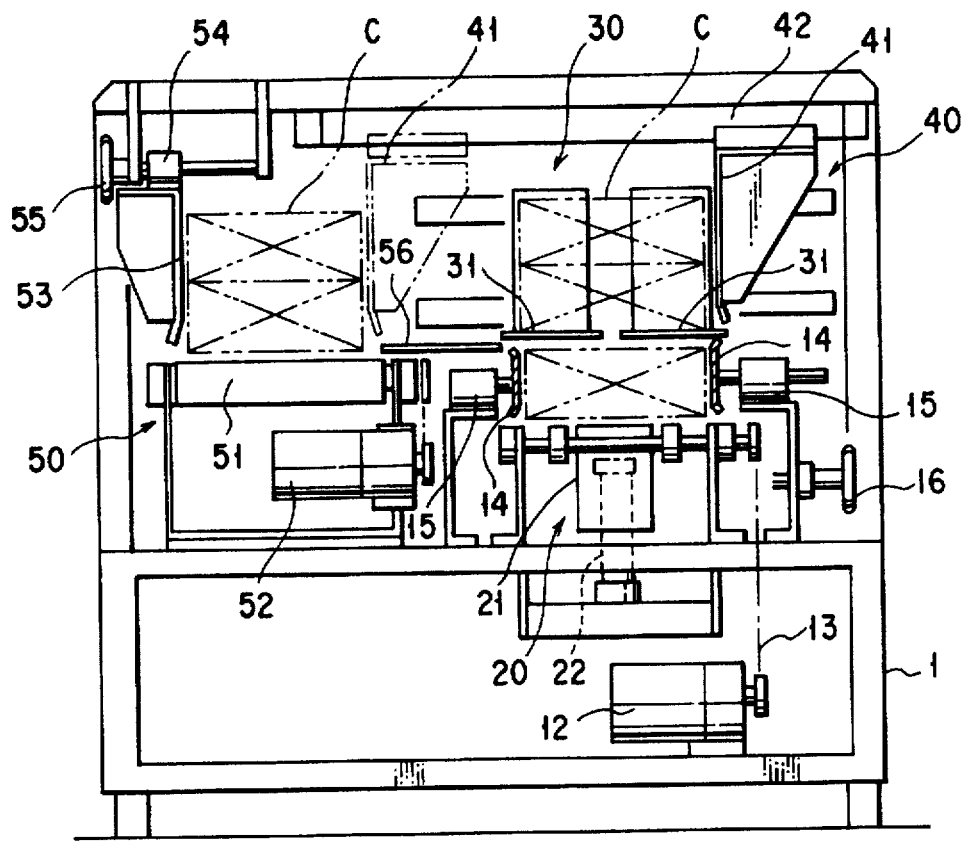
FIG. 3 is a schematic sectional view taken along line 3—3 of FIG. 1.

Referring first to FIGS. 1 to 3, an outline of the stacking apparatus according to the present embodiment will be described. FIG. 1 is a plan view showing the principal part of the apparatus, FIG. 2 is a side view in the direction of arrow 2—2 of FIG. 1, and FIG. 3 is a schematic sectional view taken along line 3—3 of FIG. 1.

The stacking apparatus has a body 1, which is in the form of a frame or combination of sections. The apparatus comprises an introducing-aligning conveyor mechanism 10, lift mechanism 20, shutter mechanism 30, transfer mechanism 40, and delivery conveyor mechanism 50. Further, the apparatus is provided with a control unit 3 for controlling those mechanisms and a transportation mechanism 2 for delivering the cases stacked by the apparatus to the next process.

The introducing-aligning conveyor mechanism 10 extends substantially in the horizontal direction, and its terminal portion is situated in the body 1. The conveyor mechanism 10 includes a pair of narrow belt conveyors 11, which extend parallel to each other with a predetermined space between them. The belt conveyors 11 are synchronously run at the same speed by means of a drive mechanism which includes a motor 12, chain 13, etc.

Cases C are delivered one by one from a preceding process, e.g., a product encasing process, onto the belt conveyors 11. The delivered cases C are transported one after another at predetermined intervals on the conveyors 11. Stopper means is provided at the terminal portion of the conveyors 11. One transported case C stops abutting against the stopper means, and another transported case stops abutting against the stopped case. Thus, a plurality of cases are arranged in contact with one another and in a row on the belt conveyors 11.

A belt of each belt conveyor 11 is formed of a relatively rigid synthetic resin, and comprises a plurality of smooth-surfaced shoes. Even when a case C stops on the belts, therefore, its underside can smoothly slide on the shoes without being damaged.

Elongated guide members 14 are arranged individually on the opposite sides of the introducing aligning conveyor mechanism 10, and serve to guide the cases being transported or at a standstill. The guide members 14 are designed so as to be moved from side to side by means of a plurality of position adjusting mechanisms 15, such as screw-nut mechanisms. The adjusting mechanisms 15 are designed so as to be synchronously moved from side to side by means of a wheel 16 and chains 17. Thus, when the wheel 16 is turned, the guide members 14 are synchronously moved from side to side by the position adjusting mechanisms 15, whereby the space between the guide members 14 can be adjusted corresponding to the width of each case C.

The lift mechanism 20 is located under the introducing-aligning conveyor mechanism 10. It includes a lift block 21 and cylinders 22 for moving the block 21 up and down. The lift block 21 is in the form of a box having a top face and side faces, and its width is a little shorter than the distance between the belt conveyors 11 so that the block 21 can ascend and descend between the conveyors 11. Moreover, the lift block 21 is adjusted to a length such that a plurality of cases C can be placed on it. The cylinders 22, which are two in number, can extend and contract in synchronism with each other, thereby causing the lift block 21 to move up and down in a horizontal position. In a lowered state, the top face of the lift block 21 is situated a little lower than the bearing surface of each belt conveyor 11. The lifting stroke for ascent is greater than the height of the cases C to be transported, so that the cases can be pushed up to a position higher than the level of shutter plates 31 of the shutter mechanism 30.

The shutter mechanism 30 is located over the introducing-aligning conveyor mechanism 10. The mechanism 30 includes a pair of shutter plates 31, which are synchronously moved from side to side in the horizontal direction by means of switchgear mechanisms 32, respectively, so that the mechanism 30 is opened or closed. Each shutter plate 31 is a flat plate which is a little longer than the lift block 21 so that it can support a plurality of cases C which are pushed up by the block 21. The height level of the shutter plates 31 is a little lower than the raised position of the top face of the lift block 21. Thus, while the shutter plates 31 are moving, they can never come into contact with the underside of each case C pushed up by the lift block 21.

Moreover, the shutter plates 31 are designed so that the distance between them is greater than the width of each case C when they are fully open. The stroke of the switchgear mechanisms 32 is set so that the shutter plates 31 can be closed in two states, first and second closed states. In the first closed state, the distance between the shutter plates 31 is a little greater than the width of the lift block 21, and therefore, the block 21 can be raised between the plates 31 to a position such that its top face is higher than the level of the plates 31. In the second closed state, on the other hand, the distance between the shutter plates 31 is adjusted to a value such that the edge portions of the cases C, stacked on the plates 31 and moving in the transverse direction, cannot fall into the gap between the plates 31. This distance must only be adjusted to half the width of each case C or less in order to prevent the moving cases C from falling into or being caught by the gap between the shutter plates 31. Practically, however, such an awkward situation can be securely avoided by adjusting the distance between the respective end edges of the shutter plates 31 to one-third of the width of each case C or less. Also, the time required for the open-close operation of the shutter plates 31 can be shortened by reducing the open-close stroke of the plates 31.

The delivery conveyor mechanism 50 is located beside the introducing-aligning conveyor mechanism 10 so as to extend substantially parallel to it. The conveyor mechanism 50 includes a wide belt conveyor 51, which is driven by means of a drive mechanism, such as a motor 52. The upper surface of the belt conveyor 51 is situated a little lower than that of each shutter plate 31. A slide plate 56 for transfer is interposed between the conveyor 51 and one of the shutter plates 31. One edge portion of the slide plate 56 is situated over the edge portion of the belt conveyor 51, while the other edge portion of the plate 56 is situated a little lower than the edge portion of the one shutter plate 31. Thus, this shutter plate 31 can move along the upper surface of the slide plate 56 in its open-close operation.

A substantially vertical guide plate 53 is located over the other edge portion of the belt conveyor 51 so as to extend in the transportation direction of the conveyor 51. The guide plate 53 is designed so that its position can be adjusted in the width direction of the belt conveyor 51 by means of a position adjusting mechanism 54, such as a screw-nut mechanism, and a wheel 55.

The transfer mechanism 40 is located above the shutter mechanism 30. The mechanism 40 includes a transfer plate 41 which is situated beside the shutter mechanism 30. The transfer plate 41 extends substantially parallel to the transportation direction of the introducing-aligning conveyor mechanism 10, and is moved parallel in the horizontal transverse direction by means of a pair of rodless cylinders 42. Thus, when the transfer plate 41 is moved in the transverse direction to the position indicated by two-dot chain line in FIG. 3, the stacked cases C supported on the shutter plates 31 are slid transversely on the plates 31 and the slide plate 56, and are transferred in the stacked state onto the delivery conveyor 51. The transversely moved cases C stop abutting against the guide plate 53, as shown in FIG. 3, and in this state, they are held and aligned in position between the plate 53 and the transfer plate 41.

The stacked cases C, thus transferred onto the delivery conveyor mechanism 50, are transported in the direction of the arrow in FIG. 1 by the mechanism 50, and are delivered to the next process through the transportation mechanism 2 which is located at the terminal portion of the conveyor mechanism 50.

Figure 4:
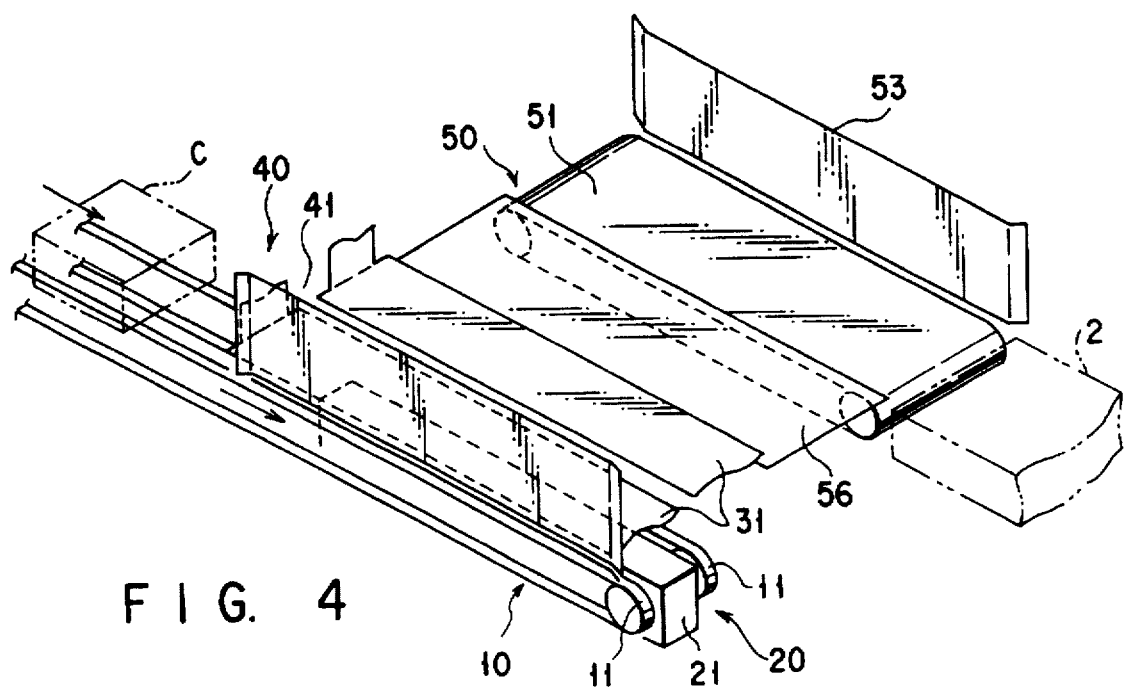
FIGS. 4 to 13 are perspective views of the principal part of the apparatus of the first embodiment for illustrating the operation thereof.

Referring now to FIGS. 4 to 13, the operation of the apparatus of the present embodiment will be described. First, the cases C are transported one after another on the belt conveyors 11 of the introducing-aligning conveyor mechanism 10, as shown in FIG. 4.

Figure 5:
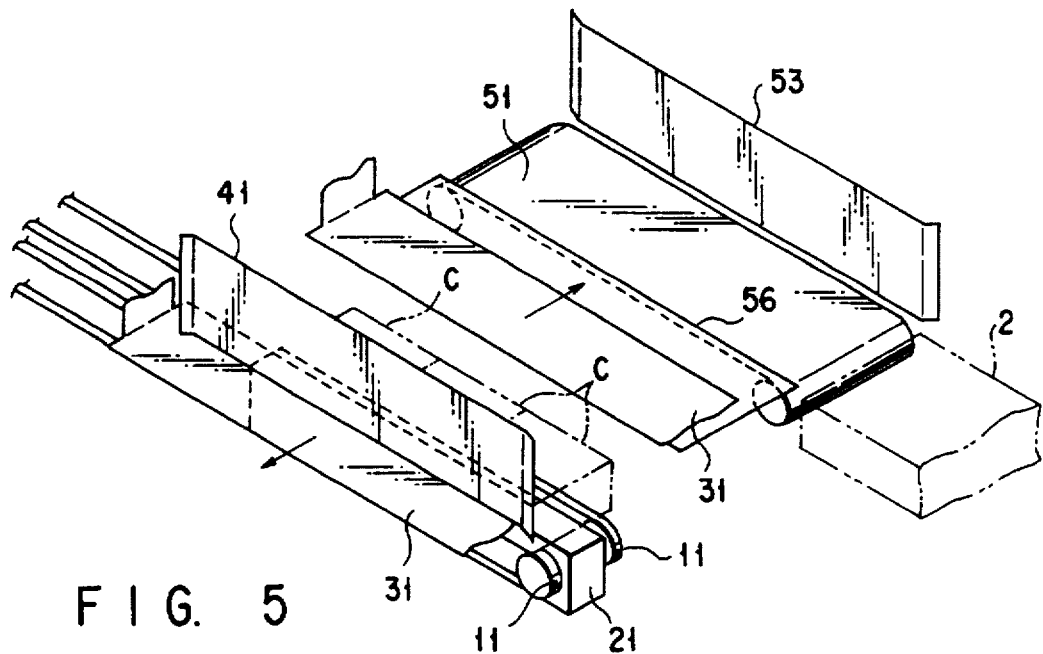

Then, the cases C abut against the stopper means, whereupon a plurality of cases C are arranged in a row on the belt conveyors 11 of the introducing-aligning conveyor mechanism 10, as shown in FIG. 5. Actually, two to ten cases C or thereabout are arranged on the belt conveyors 11. For ease of illustration, however, three cases C are shown in FIGS. 5 to 13. When a predetermined number of cases are aligned on the belt conveyors 11, the shutter plates 31 of the shutter mechanism part right and left so that the shutter mechanism opens. In this case, the distance between the shutter plates 31 is greater than the width of each case C.

Figure 6:
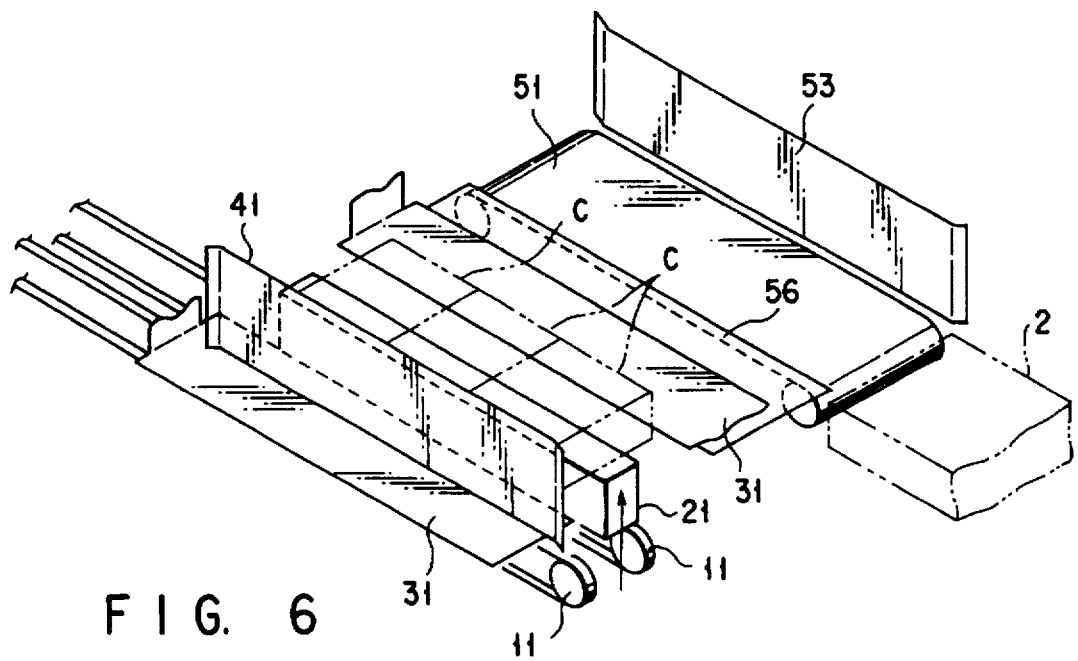

Subsequently, the lift block 21 of the lift mechanism ascends, and the cases C on the belt conveyors 11 are pushed up to the position above the shutter plates 31 through the gap between them by the block 21, as shown in FIG. 6.

Figure 7:
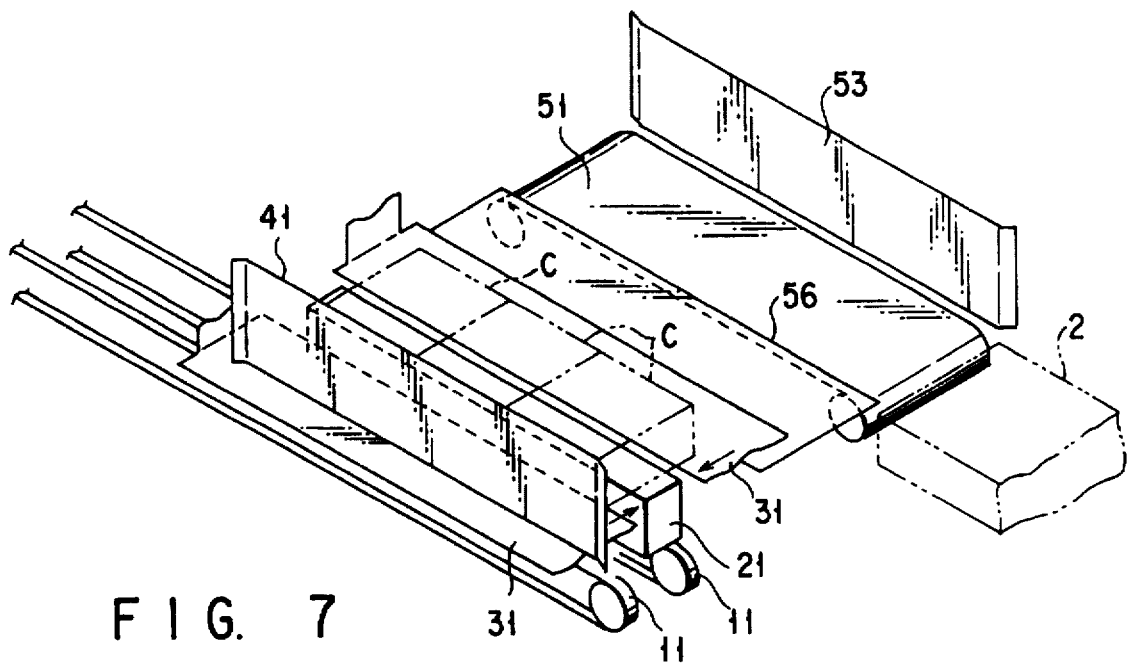

Then, the shutter plates 31 of the shutter mechanism approach each other to reach the position for the first closed state, as shown in FIG. 7. In this first closed state, the distance between the shutter plates 31 is a little greater than the width of the lift block 21, so that the edge portions of the plates 31 never interfere with the side faces of the block 21. Since the top face of the lift block 21 is elevated to the position higher than the shutter plates 31, moreover, the plates 31 can move to the region under the bottom edge portions of the cases C without touching the underside of each case C which is pushed up by the lift block 21.

Figure 8:
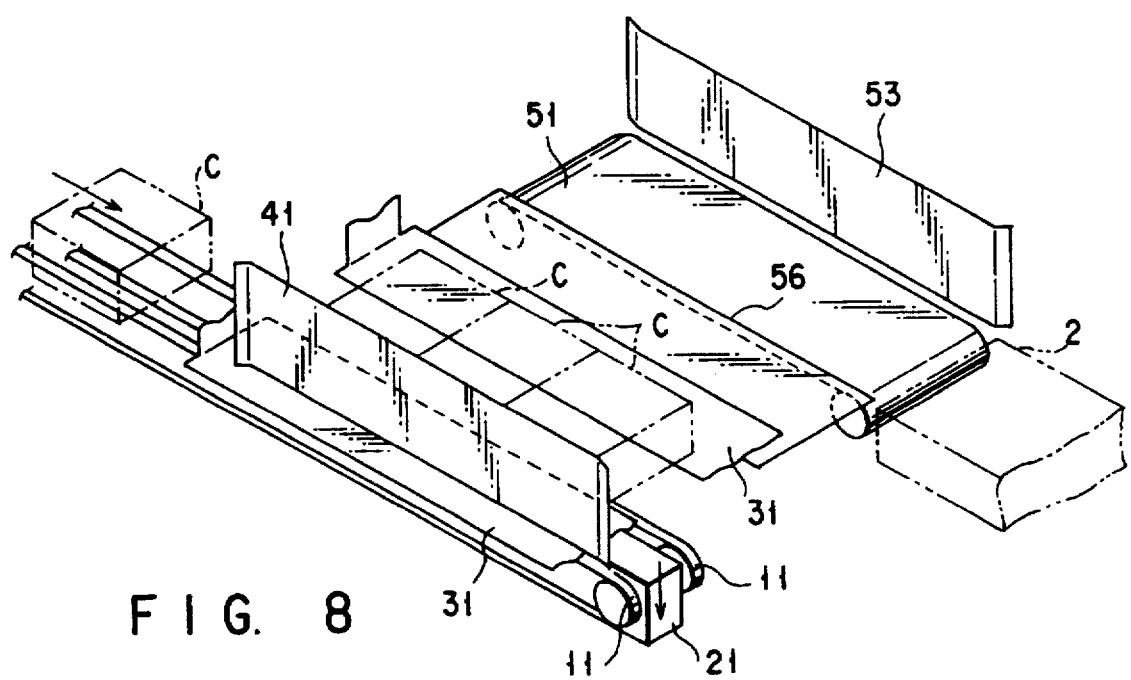
Figure 9:
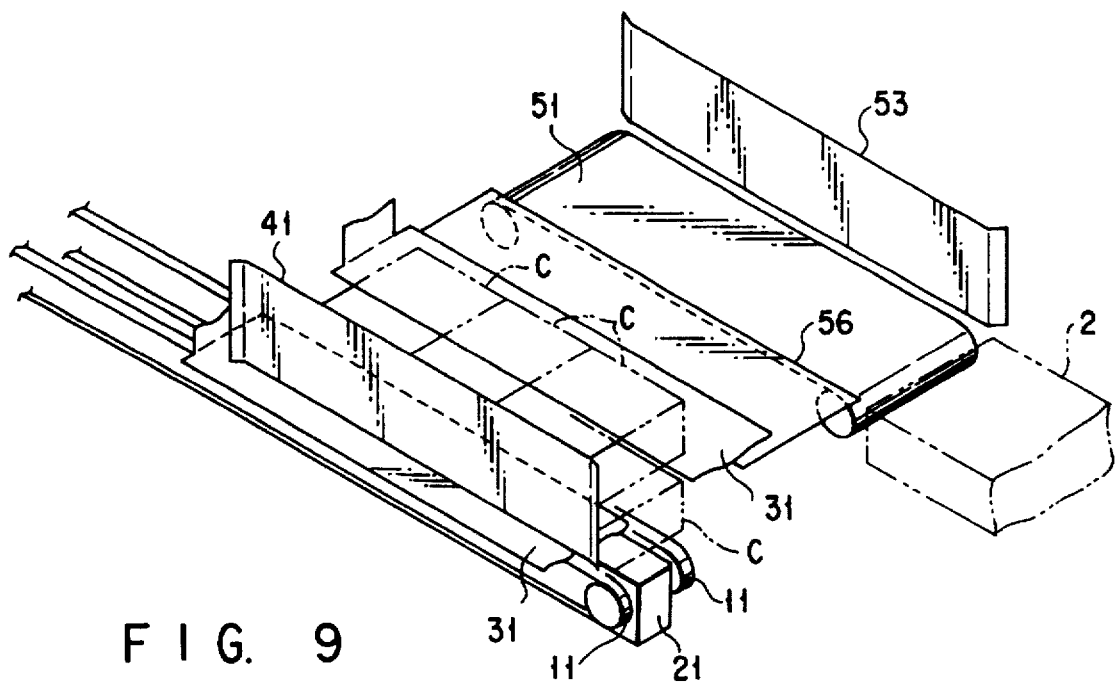

Subsequently, the lift block 21 descends, as shown in FIG. 8, whereupon the cases C also descend. Since the shutter plates 31 in the first closed state are situated under the bottom edge portions of the cases C, however, the cases C are supported in the aligned state on the plates 31. Then, another set of cases C are transported one after another onto the belt conveyors 11 of the introducing-aligning conveyor mechanism. Thereupon, a plurality of cases C are arranged in a row on the belt conveyors 11, as shown FIG. 9.

Figure 10:
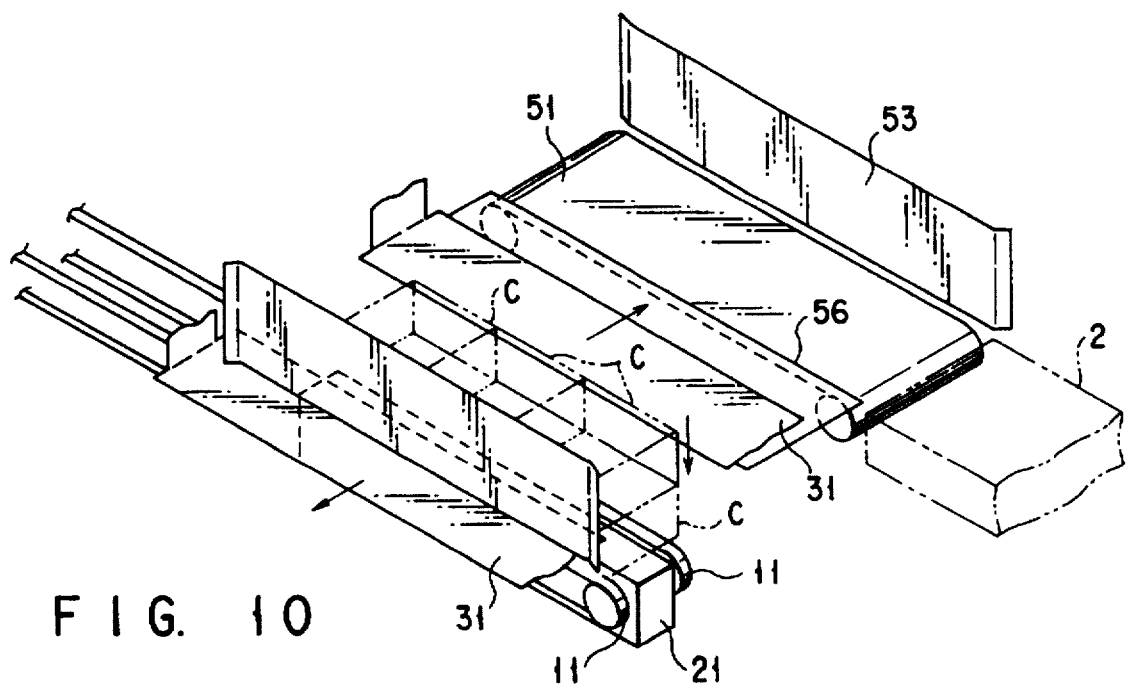

Subsequently, the shutter plates 31 separate to the position for the open state, as shown in FIG. 10. In this state, the distance between the shutter plates 31 is greater than the width of each case C, so that the cases C, having so far been supported in alignment with one another on the plates 31, fall. In this case, the shutter plates 31 move in sliding contact with the underside of each case C. Since the plates 31 synchronously move in opposite directions, however, the sliding resistance between the plates 31 and the underside of each case C, which is produced as the plates 31 move, is bisymmetrical. Accordingly, the cases C fall substantially plumb down without shifting their positions as they slide on the shutter plates 31. The distance between the overlying cases C supported on the shutter plates 31 and the underlying cases C arranged on the belt conveyors 11, that is, fall of the cases C, is adjusted to about 5 mm to 30 µm. Thus, the overlying cases C fall onto the underlying cases C without substantially shifting their positions, whereupon the cases are stacked in two layers.

Figure 11:
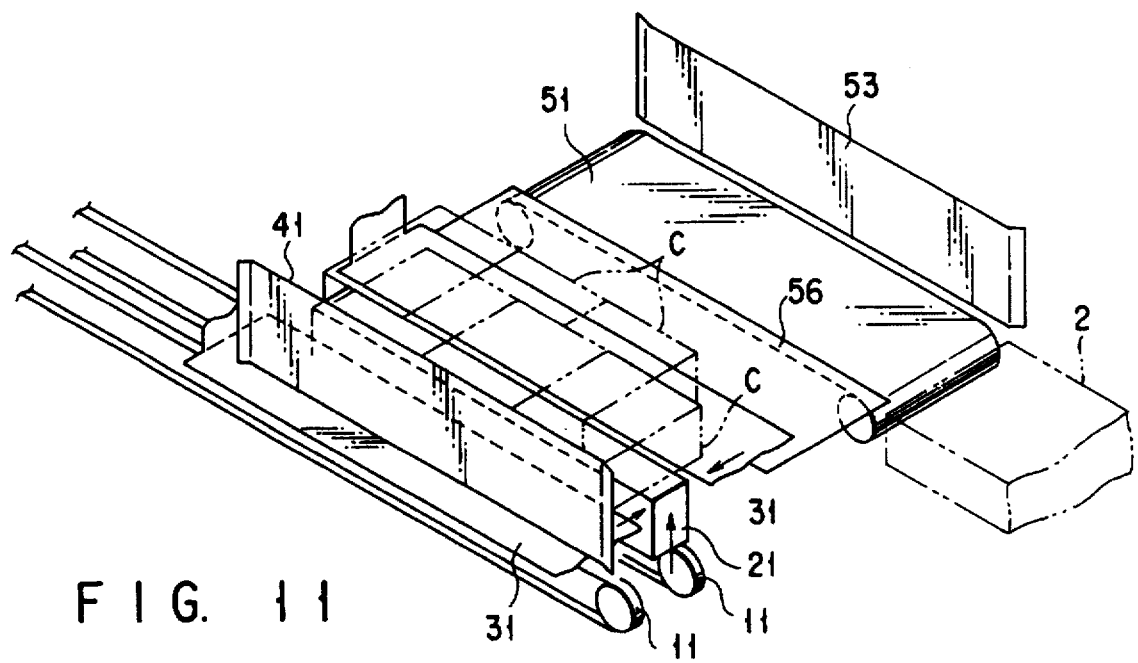

Then, the lift block 21 ascends, thereby pushing up the cases C which are stacked in two layers on the belt conveyors 11, as shown in FIG. 11. When these cases C are pushed up, the shutter plates 31 move again to the position for the first closed state. Also in this case, the shutter plates 31 never come into contact with the underside of each underlying case C.

Figure 12:
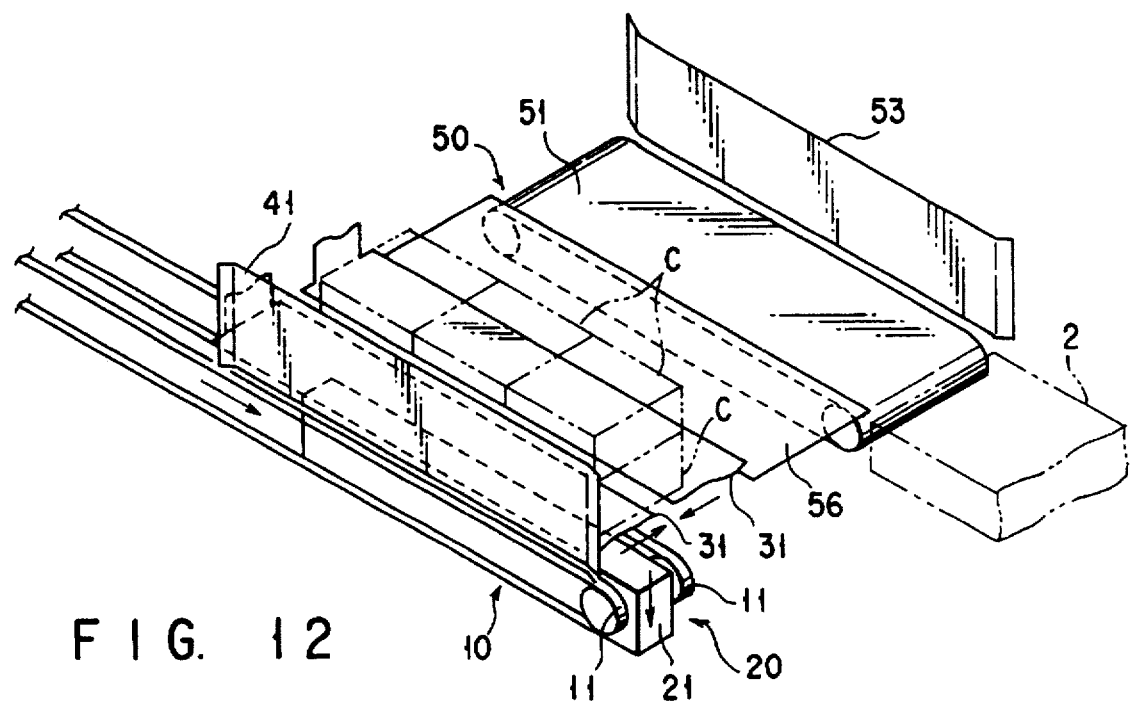

Thereafter, the lift block 21 descends, whereupon the stacked cases C in two layers are supported on the shutter plates 31, as shown in FIG. 12. The shutter plates 31 in this state then move to the position for the second closed state. As this is done, the shutter plates 31 slide on the underside of each case C thereon. Since the right- and left-hand shutter plates 31 move in synchronism with each other, however, the sliding resistance between the plates 31 and the underside of each case C is bisymmetrical, so that the stacked cases C never shift their positions. As mentioned before, the distance between the shutter plates 31 in the second closed state is short.

Figure 13:
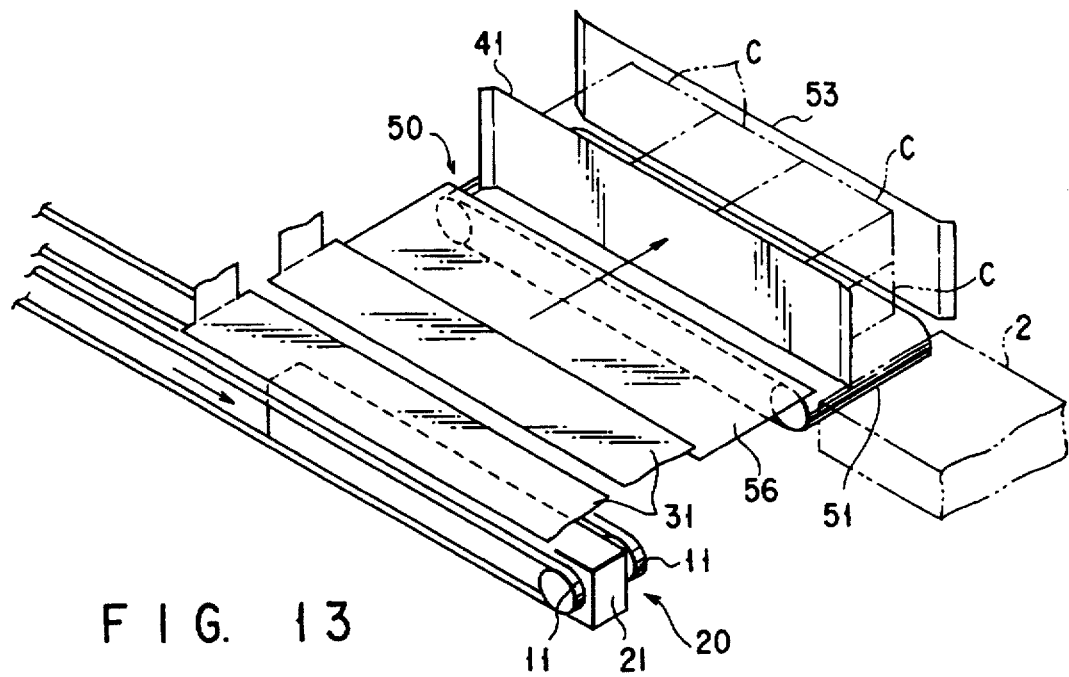

Then, the transfer plate 41 of the transfer mechanism 40 is moved in the transverse direction by the rod-less cylinders 42, as shown in FIG. 13. As the transfer plate 41 is moved in this manner, it abuts against the respective side faces of the cases C stacked in alignment with one another. Then, the cases C, kept in the stacked state, are transferred onto the belt conveyor 51 of the delivery conveyor mechanism in a manner such that they are slid transversely on the shutter plates 31 and the slide plate 56 for transfer. In this case, the shutter plates 31 are in the second closed state, that is, the distance between them is narrow. As the cases C move transversely sliding on the shutter plates 31, therefore, there is no possibility of their bottom edge portions falling between the plates 31 or junctions between the bottom portions and the like being caught by the edges of the plates 31.

The cases C on the belt conveyor 51 of the delivery conveyor mechanism stop abutting against the guide plate 53, and are held between the shutter plates 31. Even if the aligned stacked cases C are dislocated in some measure during the aforesaid stacking and transfer operations, therefore, they can be accurately aligned between the guide plate 53 and the transfer plate 41 in the end.

The cases C, aligned and stacked in this manner, are transferred directly to another transportation mechanism 2 by means of the belt conveyor 51 of the delivery conveyor mechanism, whereupon they are delivered to the next process, e.g., a cording or palletizing process.

The sequence of operations of the aforementioned mechanisms, timings for the operations, etc. are controlled by means of the control unit 3. The control unit 3, which is composed of a relay, timer, and other control circuits, is programmed so as to control the operation of the apparatus according to the embodiment of the present invention described above. Since the control unit 3 itself is constructed in the same manner as a conventional one, a description of its arrangement is omitted.

Figure 14:
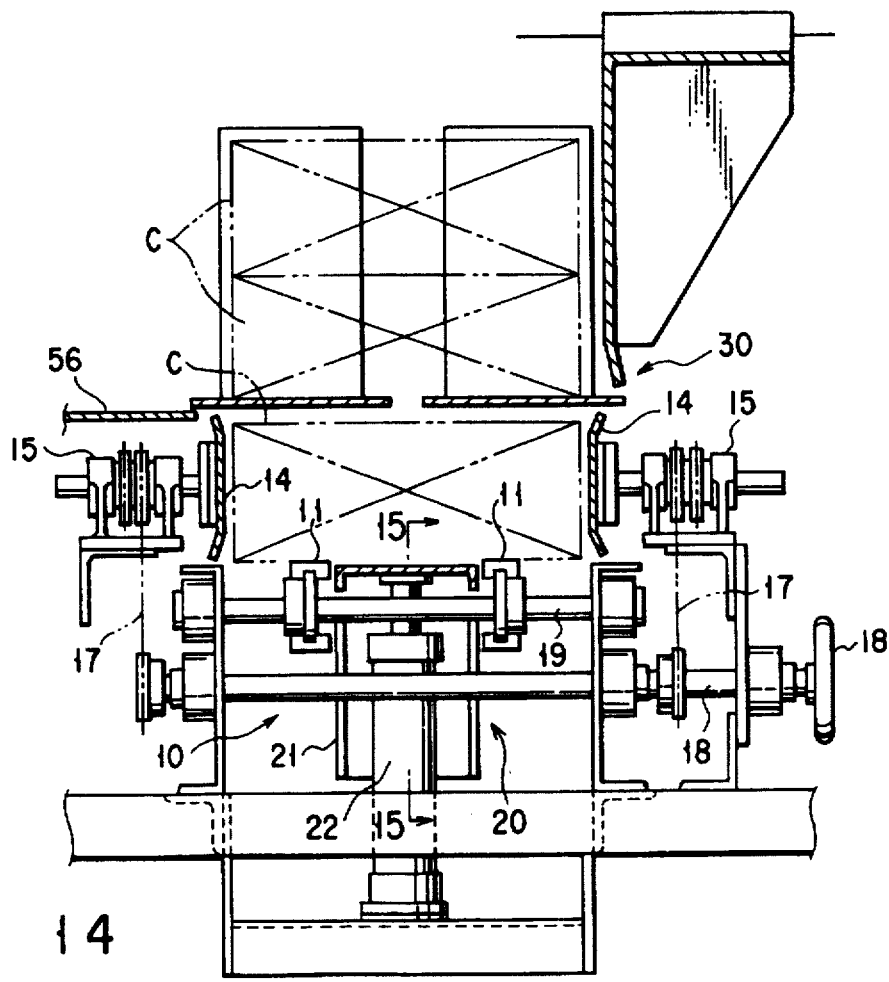
FIG. 14 is a sectional view showing the principal part of the apparatus of the first embodiment.

The following is a description of the details of the construction and operation of various parts of the apparatus of the present embodiment. FIG. 14 is a sectional view showing the introducing-aligning conveyor mechanism 10, lift mechanism 20, shutter mechanism 30, etc. The pair of belt conveyors 11, right and left, of the conveyor mechanism 10 are passed around a pair of pulleys which are mounted on a common shaft 19 with a predetermined space between them, and are arranged so as to be synchronously driven at the same traveling speed.

Each of the two guide members 14, right and left, is designed so as to be moved from side to side by two position adjusting mechanisms 15, such as screw-nut mechanisms. The two pairs of adjusting mechanisms 15 are synchronously moved from side to side by means of their corresponding chains 17 and a common shaft 18 on which the wheel 16 is mounted. Thus, the distance between the guide members 14 can be adjusted as the adjusting mechanisms 15 move symmetrically with respect to the center of the introducing-aligning conveyor mechanism 10.

Figure 15:
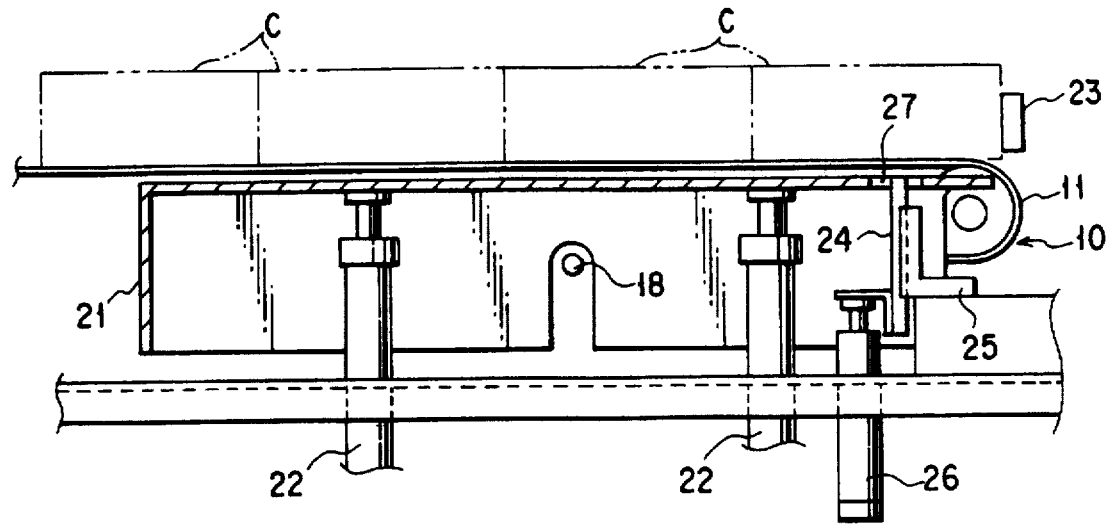
FIGS. 15 and 16 are longitudinal sectional views taken along line 15—15 of FIG. 14.
Figure 16:
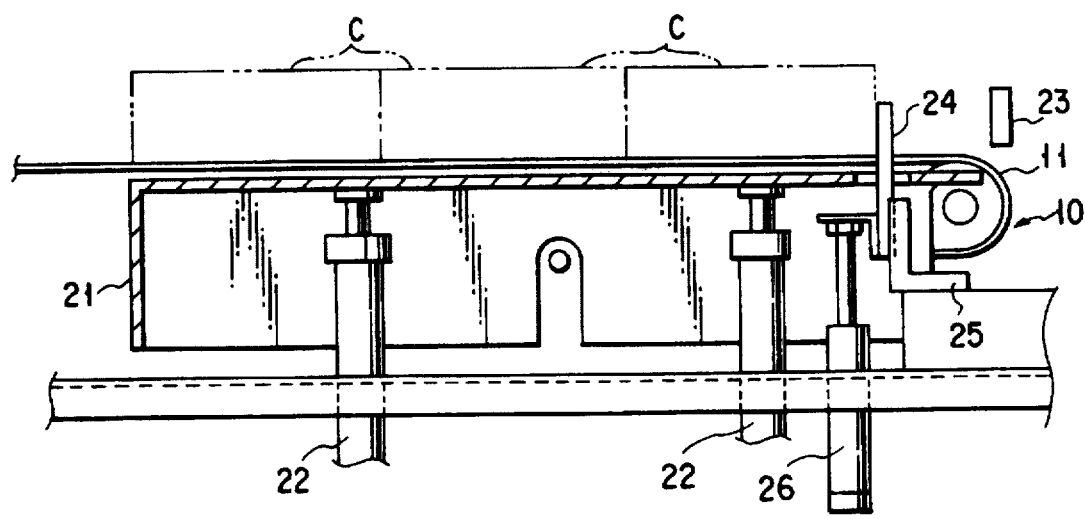

As shown in FIGS. 14 to 16, moreover, the lift block 21 of the lift mechanism 20 has the form of an open-bottomed box, and is designed so as to be raised and lowered in a horizontal posture by means of the two cylinders 22.

Located at the terminal portion of the belt conveyors 11 of the introducing-aligning conveyor mechanism 10 is a fixed stopper 23 which is fixed to the body 1 of the apparatus. The cases C transported by the belt conveyors 11 stop abutting against the stopper 23, whereupon a plurality of cases C are arranged in alignment with one another on the conveyors 11. The lift block 21 is long enough to carry thereon the cases C arranged on the belt conveyors 11.

Moreover, a movable stopper 24 is provided at the terminal portion of the belt conveyors 11. It is situated short of the fixed stopper 23. The movable stopper 24 is guided by a guide member 25 as it is moved up and down by means of a cylinder 26. When it is raised, the stopper 24 projects above the respective bearing surfaces of the belt conveyors 11 through a hole 27 in the top face of the lift block 21, thereby stopping the cases C transported on the conveyors 11 at its position.

Normally, the movable stopper 24 is lowered, so that the cases C transported on the belt conveyors 11 stop abutting against the fixed stopper 23, and are aligned on the conveyors 11, as shown in FIG. 15. Depending on the size of each case C, however, the central portion of the trailing case C may be situated corresponding to the rear end portion of the lift block 21, as shown in FIG. 15. If the lift block 21 ascends in this state, only half of the trailing case C rests on the lift block 21, so that this case cannot be supported with stability.

In such a situation, the movable stopper 24 ascends, so that the cases C transported on the belt conveyors 11 stop abutting against the stopper 24, as shown in FIG. 16. Thus, the respective stop positions of the cases C are changed so that the trailing case C rests substantially entire on the lift block 21. If the lift block 21 ascends in this state, therefore, the trailing case C can be pushed up with stability. It is to be understood that the number of cases C carried on the lift block 21 is reduced by one in this situation.

Figure 17:
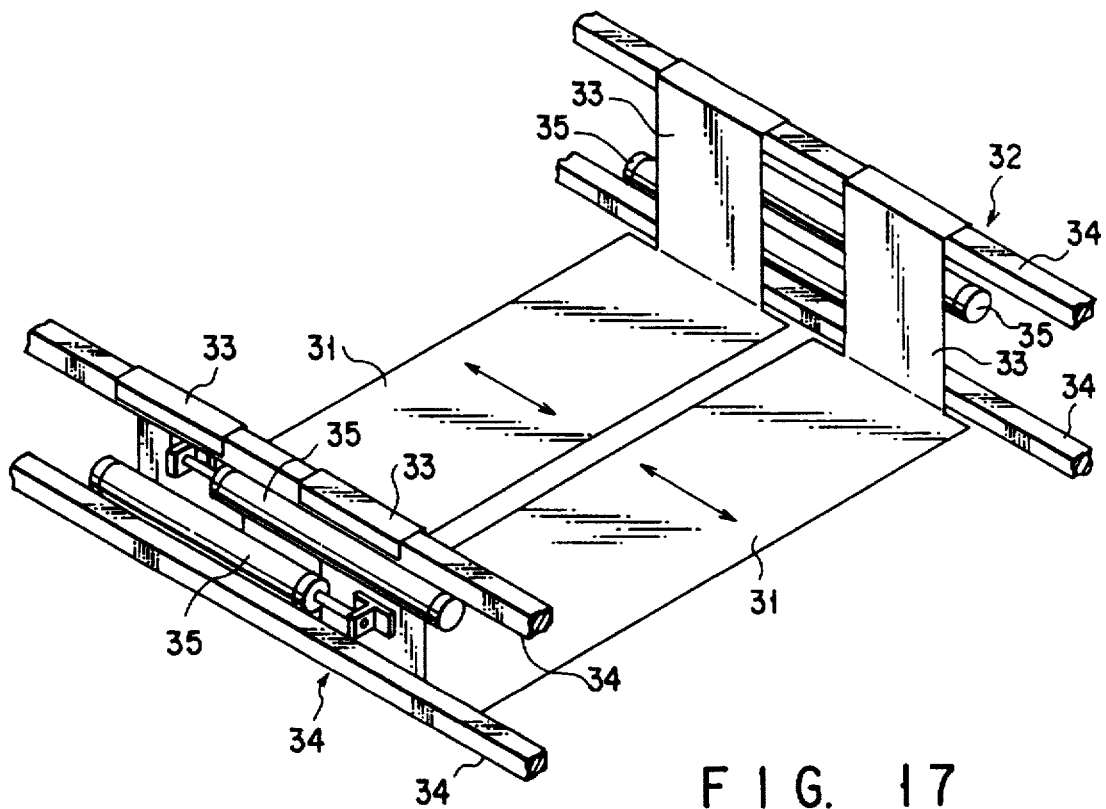
FIG. 17 is a perspective view of the principal part of a shutter mechanism according to the first embodiment.

FIG. 17 shows part of the shutter mechanism 30. As mentioned before, the mechanism 30 includes a pair of shutter plates 31 which are formed of stainless steel or other plate material. Upwardly bent guide support portions 33 are formed individually on the front and rear end portions of each shutter plate 31. The shutter plates 31 are opened or closed as their guide support portions 33 are guided and moved horizontally sideways by the switchgear mechanisms 32.

Each switchgear mechanism 32 is provided with a pair of guide members 34, upper and lower, whereby the guide support portions 33 are guided in transverse movement. Moreover, the shutter plates 31 are synchronously driven for open-close operation by means of cylinders 35.

Figure 18:
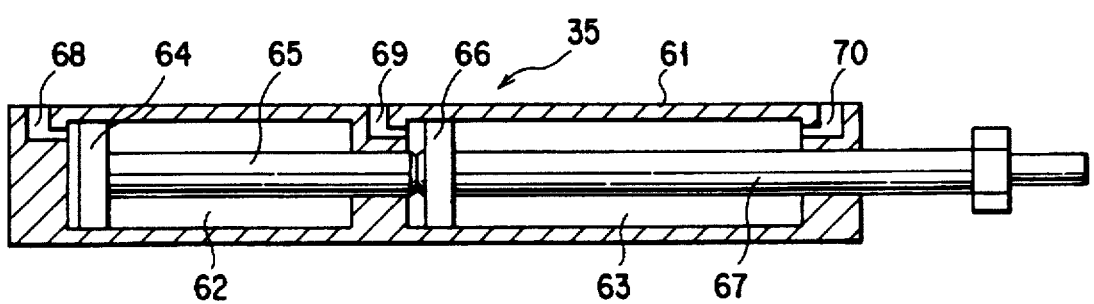
FIG. 18 is a longitudinal sectional view of a cylinder of the shutter mechanism according to the first embodiment.

Each cylinder 35 is of a dual-stroke type, and is constructed in the manner shown in FIG. 18. First and second chambers 62 and 63 are defined in a body 61 of the cylinder 35. The stroke of the second chamber 63 is longer than that of the first chamber 62. A first piston 64 and a first rod 65 are housed for sliding motion in the first chamber 62. Likewise, a second piston 66 and a second rod 67 are housed for sliding motion in the second chamber 63. The first combination of piston 64 and rod 65 is formed separately from the second combination of piston 66 and rod 67. The second rod 67 extends to the outside of the body 61, and its extreme end portion is connected to its corresponding guide support portion 33 of the corresponding shutter plate 31.

When pneumatic pressure or the like is fed through a first port 68 into the first chamber 62 of the cylinder 35 constructed in this manner, the first and second rods 62 and 67 stretch together for the stoke of the first chamber 62. In this case, the shutter plates 31 are moved to the position for the first closed state in which the distance between the plates 31 is a little greater than the width of the lift block 21. When pneumatic pressure or the like is fed through a second port 69 into the second chamber 63, only the second 67 stretches for the stoke of the second chamber 63. In this case, the shutter plates 31 are moved to the position for the second closed state in which the distance between the plates 31 ranges from about 10 mm to 60 mm. When pneumatic pressure is fed through a third port 70, the rods 62 and 63 are contracted, so that the shutter plates 31 are separated to the open state.

With use of the dual-stroke cylinders 35 constructed in this manner, the shutter plates 31 can be accurately controlled so as to be shifted between the three states, the open state and the first and second closed states. The use of the cylinders 35 makes the construction of the shutter mechanism simpler than in the case the shutter plates 31 are controlled for the closed position by means of a combination of position sensors, such as optical sensors, limit switches, etc. Since the two closed positions of the shutter plates 31 can be regulated by utilizing the respective stroke ends of the cylinders 35, moreover, the plates 31 can be accurately stopped in position, their operating speed can be increased, and the reliability of operation can be improved.

FIG. 19 is a schematic plan view showing an apparatus according to a second embodiment of the present invention. This apparatus is provided with a plurality of introducing-aligning conveyor mechanisms such that a plurality of cases transported thereon are stacked in alignment with one another in a direction perpendicular to the transportation direction.

More specifically, according to the second embodiment, introducing-aligning conveyor mechanisms 10 which are identical with the aforesaid one are arranged parallel to one another in a plurality of rows, e.g., three rows. Also, a lift block 21 which resembles the aforesaid one is provided at the terminal portion of belt conveyors 11 of each conveyor mechanism 10. The lift block 21 is shorter than each case C with respect to the transportation direction. Three cases C transported on their corresponding pairs of belt conveyors 11 are stopped at a predetermined position by means of a stopper (not shown), and are arranged in a row at right angles to the transportation direction of the belt conveyors 11.

Further, the apparatus according to the present embodiment comprises a shutter mechanism similar to the aforesaid one. Shutter plates 31 of this shutter mechanism are designed so as to open and close horizontally in the longitudinal direction or in the transportation direction of the belt conveyors 11. Also, the shutter plates 31 are arranged so that the distance between them is greater than the length of each case C when they are fully open. Furthermore, the shutter plates 31 are designed so that the distance between them is shorter than the length of each case C and a little greater than the length of each lift block 21 when in a first closed state, and ranges from about 10 mm to 60 mm, for example, when in a second closed state.

The apparatus according to the present embodiment is constructed in the same manner as the one according to the first embodiment except that the shutter plates 31 open and close in the transportation direction. The cases C, stacked crosswise in a row on the shutter plates 31, are transferred onto a delivery conveyor mechanism 50 by means of a transfer plate 41 of a transfer mechanism, whereupon they are delivered to the next process. Thus provided with a plurality of introducing-aligning conveyor mechanisms 10, the apparatus according to the present embodiment can stack cases C which are transported from a plurality of lines, so that its operating efficiency is high.

Figure 20:
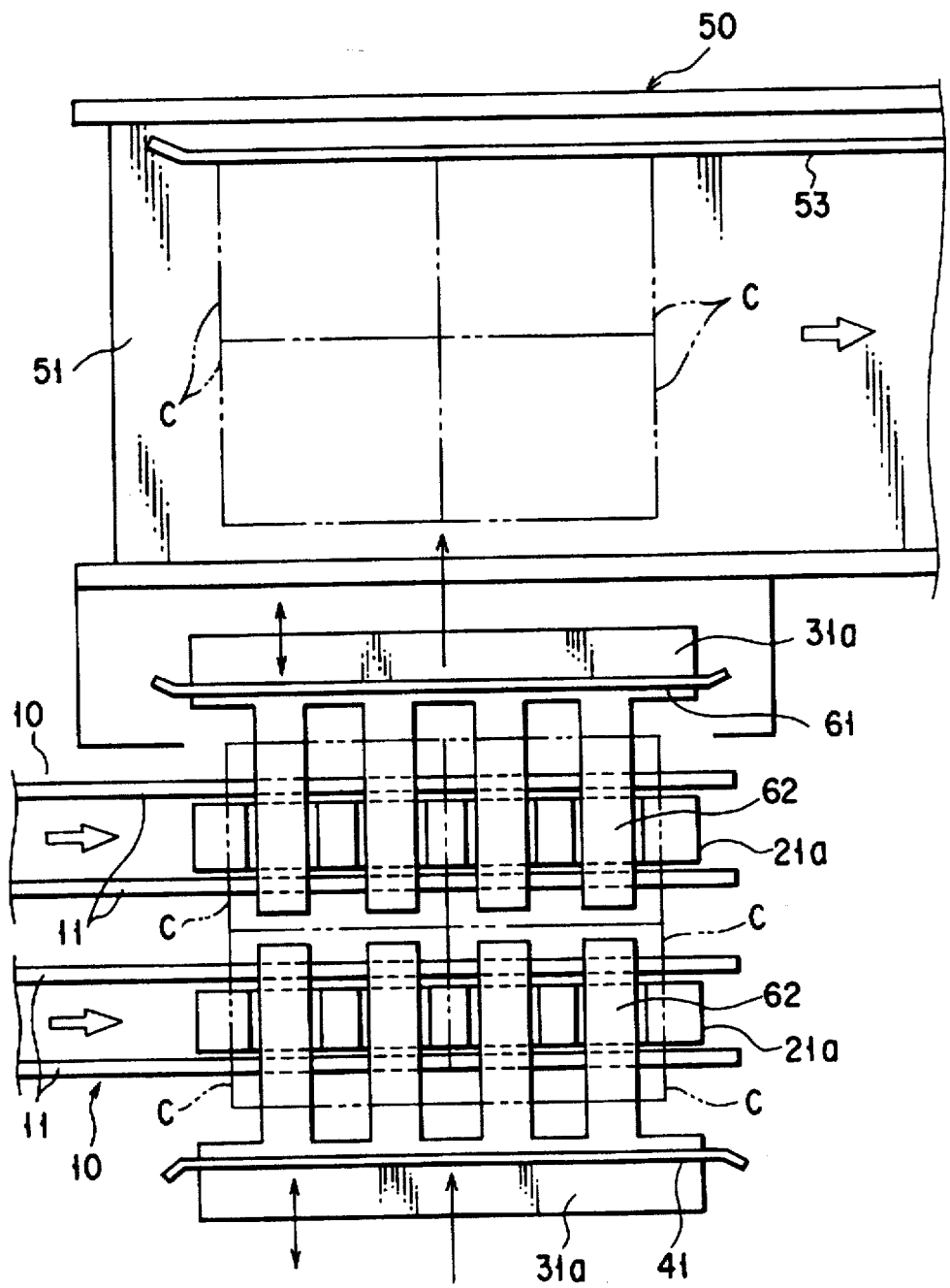
FIG. 20 is a schematic plan view showing a third embodiment.

FIGS. 20 and 21 show an apparatus according to a third embodiment of the present embodiment. This apparatus resembles the apparatus according to the first embodiment in that shutter plates of a shutter mechanism open and close in the transverse direction or in a direction perpendicular to the transportation direction. According to the third embodiment, however, introducing-aligning conveyor mechanisms are arranged in a plurality of rows, e.g., two rows, and a plurality of cases, e.g., two cases, are arranged on each conveyor mechanism. Thus, two pairs of cases, four in total, are stacked in two rows.

The apparatus according to the third embodiment comprises two introducing-aligning conveyor mechanisms 10 which are identical with the one according to the first embodiment. A lift block 21a is provided at the terminal portion of a pair of belt conveyors 11 of each conveyor mechanism 10. The two lift blocks 21a and shutter plates 31a of a shutter mechanism are constructed in the manner shown in FIG. 21 in order to support cases C in two rows which are pushed up by the lift blocks 21a.

A plurality of finger portions 62 protrude like the teeth of a comb from the respective opposite edge portions of the shutter plates 31a. The shutter plates 31a open at a distance greater than the sum of the respective widths of two cases C, and close to a closed position such that the finger portions 62 face one another beyond the lift blocks 21a at a distance of about 10 mm to 60 mm in the central position between the blocks 21a. A plurality of recesses 63 are formed in the top face of each lift block 21a, corresponding to the finger portions 62 of each shutter plate 31a.

The apparatus of the present embodiment operates substantially in the same manner as the apparatus of the first embodiment, provided that the cases C in two rows are stacked together. According to the present embodiment, the double-lined cases C separate together with the shutter plates 31a from one each other as the plates 31a open. Accordingly, a guide plate 61 are provided opposite to a transfer plate 41 so that the cases C can be guided between the plates 61 and 41 as the shutter plates 31a open, whereby the cases C can be kept in alignment. In transferring the cases C stacked on the shutter plates 31a to a delivery conveyor mechanism 51, the guide plate 61 is moved upward, for example.

The apparatus according to the present embodiment can stack a plurality of cases in a plurality of rows, so that its operating efficiency is high. In supporting the cases C pushed up by the lift blocks 21a by means of the shutter plates 31a, the finger portions 62 of the plates 31a are inserted between the underside of each case C and the recesses 63 of the blocks 21a, so that the shutter plates 31a and the lift blocks 21a never interfere with one another. According to the first embodiment, the shutter plates 31 are closed in two states, the first closed state in which the distance between the plates 31 is greater than the width of the lift block and the second closed state in which the distance between the plates 31 is shorter than the width of the lift block. According to the present embodiment, however, only one closed state is needed such that the finger portions 62 of the pair of shutter plates 31a extend beyond the recesses 63 of the lift blocks 21a and face one another at a distance of about 10 mm. Thus, the shutter plates 31a require only simple switchgear mechanisms.

FIG. 22 shows a lift block and shutter plates according to a fourth embodiment of the present invention. An apparatus according to the present invention, like the one according to the first embodiment, comprises one introducing-aligning conveyor mechanism, one lift block, and a pair of shutter plates which open and close sideways. As in the third embodiment, however, a plurality of finger portions 62 protrude like the teeth of a comb from each of shutter plates 31b, and a plurality of recesses 63 are formed in the top face of a lift block 21b, corresponding to the finger portions 62.

The apparatus of the fourth embodiment operates in the same manner as the apparatus of the first embodiment except for the following process. As in the third embodiment, the shutter plates 31b require only one closed state such that the respective distal end portions of their finger portions 62 penetrate their corresponding recesses 63 of the lift block 21b and face one another at a distance of about 10 mm in the central portion of the block 21b. Thus, the shutter plates 31b require only simple switchgear mechanisms.

The present invention is not limited to the embodiments described above. Although the cases are stacked in two layers according to foregoing embodiments, they may be stacked in three layers or more by repeating the aforementioned processes of operation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for stacking in layers a plurality of cases transported one after another, comprising:

an introducing-aligning conveyor mechanism for introducing and aligning the cases;

a lift mechanism for pushing up the cases aligned on the introducing-aligning conveyor mechanism; and a shutter mechanism including a pair of shutter plates arranged over the introducing-aligning conveyor mechanism and horizontally and synchronously movable in opposite directions, for open-close operation, wherein the cases aligned on the introducing-aligning conveyor mechanism are pushed up above the shutter plates of the shutter mechanism by the lift mechanism, said shutter plates being free of contact with the top of said cases, the lifted cases are supported by the shutter plates, the shutter mechanism opens after cases of another are set aligned on the introducing-aligning conveyor mechanism, the cases of the first set having so far been supported by the shutter mechanism are stacked on the cases of the second set aligned on the introducing-aligning conveyor mechanism, and the stacked cases are pushed up by the lift mechanism and supported by the shutter mechanism, said processes of operation being repeated so that the cases are stacked in a plurality of layers on the shutter plates of the shutter mechanism.

2. An apparatus for stacking a plurality of cases according to claim 1, which further comprises a delivery conveyor mechanism located beside the shutter mechanism so as to be substantially flush with the shutter plates of the shutter mechanism and a transfer mechanism for moving the stacked cases on the shutter mechanism sideways, thereby transferring the cases onto the delivery conveyor mechanism, and wherein the cases stacked on the shutter plates of the shutter mechanism are moved sideways to be transferred onto the delivery conveyor mechanism by means of the transfer mechanism.

3. An apparatus for stacking a plurality of cases according to claim 2, wherein said transfer mechanism includes a transversely movable transfer plate adapted to abut against the side faces of a plurality of cases stacked on the shutter plates of the shutter mechanism, thereby causing the cases to slide sideways on the shutter plates to be transferred onto the delivery conveyor mechanism, and which further comprises a guide plate located beside the delivery conveyor mechanism, whereby the cases transferred onto and stacked on the delivery conveyor mechanism are held between the guide plate and the transfer plate to be rearranged for alignment.

4. An apparatus for stacking a plurality of cases according to claim 3, wherein the position of said guide plate with respect to the center of the delivery conveyor mechanism in the width direction is adjustable depending on the size of the cases to be stacked.

5. An apparatus for stacking a plurality of cases according to claim 1, wherein said lift mechanism includes a lift block having a width shorter than that of each case and used to push up the cases transported by the delivery conveyor mechanism and an up-and-down mechanism for raising and lowering the lift block, the up-and-down mechanism causing the lift block to move between a down position in which a top face of the lift block is situated below the bearing surface of the delivery conveyor mechanism and an up position in which the top face of the lift block is situated above the respective upper surfaces of the shutter plates; and said shutter mechanism includes switchgear mechanisms for synchronously moving the shutter plates in opposite directions for open-close operation, the switchgear mechanisms switching the state of the shutter plates between an open state in which the distance between the shutter plates is longer than the width of each case and a closed state in which the distance between the shutter plates is shorter than the width of each case, at the least.

6. An apparatus for stacking a plurality of cases according to claim 5, wherein said switchgear mechanisms for the shutter plates switch the shutter plates between an open state in which the distance between the shutter plates is longer than the width of each case, a first closed state in which the distance between the shutter plates is shorter than the width of each case and longer than the width of the lift block, and a second closed state in which the distance between the shutter plates is shorter than the width of the lift block.

7. An apparatus for stacking a plurality of cases according to claim 1, wherein said lift block is long enough to allow a plurality of cases, arranged in the transportation direction on the delivery conveyor mechanism, to be placed thereon.

* * * * *